US011392576B2

(12) United States Patent
Li et al.

(10) Patent No.: US 11,392,576 B2
(45) Date of Patent: Jul. 19, 2022

(54) DISTRIBUTED PESSIMISTIC LOCK BASED ON HBASE STORAGE AND THE IMPLEMENTATION METHOD THEREOF

(71) Applicant: Guizhou Esgyn Information Technology Co., Ltd., Guiyang (CN)

(72) Inventors: Yingshuai Li, Guiyang (CN); Xiaozhong Wang, Guiyang (CN); Ming Liu, Guiyang (CN)

(73) Assignee: GUIZHOU ESGYN INFORMATION TECHNOLOGY CO., LTD., Guiyang (CN)

( * ) Notice: Subject to any disclaimer, the term of this patent is extended or adjusted under 35 U.S.C. 154(b) by 63 days.

(21) Appl. No.: 17/069,873

(22) Filed: Oct. 14, 2020

(65) Prior Publication Data

US 2022/0043796 A1    Feb. 10, 2022

(30) Foreign Application Priority Data

Aug. 4, 2020    (CN) .......................... 202010773065.5

(51) Int. Cl.
*G06F 16/00* (2019.01)
*G06F 16/23* (2019.01)
*G06F 16/22* (2019.01)

(52) U.S. Cl.
CPC ...... *G06F 16/2343* (2019.01); *G06F 16/2228* (2019.01)

(58) Field of Classification Search
CPC ............. G06F 16/2343; G06F 16/2228; G06F 16/24532; G06F 16/2471
See application file for complete search history.

(56) References Cited

U.S. PATENT DOCUMENTS

2006/0253856 A1 * 11/2006 Hu .......................... G06F 9/526
                                                                    718/104
2012/0059668 A1 *  3/2012 Baldock ................. G16H 10/60
                                                                    705/3

(Continued)

FOREIGN PATENT DOCUMENTS

RU          2711348 C1 *  1/2020  ......... G06F 16/2315

OTHER PUBLICATIONS

Gregory Chanan. "Apache HBase Internals: Locking and Multiversion Concurrency Control", https://web.archive.org/web/20160401003737/https://blogs.apache.org/hbase/entry/apache_hbase_internals_locking_and (Year: 2013).*

(Continued)

*Primary Examiner* — Syed H Hasan
(74) *Attorney, Agent, or Firm* — Bayramoglu Law Offices LLC (57) ABSTRACT

A distributed pessimistic lock based on HBase storage and a method for implementing a database pessimistic lock; the distributed pessimistic lock including a lock manager configured to be installed on a Region of a RegionServer node of a HBase system, the lock manager has a lock and unlock interface; and the distributed pessimistic lock, an operation transaction, and a lock holder form a cross linked list format; a horizontal dimension is an information of a current data row, a vertical dimension is an information of the operation transaction, and an intersection point between the horizontal dimension and the vertical dimension is the lock holder. By installing the lock manager on a node Region of a HBase storage system, the lock manager locks and unlocks a data operation of the HBase system with the distributed pessimistic lock.

9 Claims, 4 Drawing Sheets (56) References Cited

U.S. PATENT DOCUMENTS

| | | | |
|---|---|---|---|
| 2013/0060742 A1* | 3/2013 | Chang | G06F 16/2365 |
| | | | 707/704 |
| 2013/0174165 A1* | 7/2013 | Chopra | G06F 11/1482 |
| | | | 707/E17.001 |
| 2020/0117651 A1* | 4/2020 | Puchin | G06F 16/25 |

OTHER PUBLICATIONS

Wolle et al. "A Note on Contraction Degeneracy". (Year: 2004).*
Molly Galetto. "Hbase Row Locks". https://web.archive.org/web/20160316051817/http://www.ngdata.com/hbase-row-locks/ (Year: 2015).*
Andre Medeiros. "HAcid: A lightweight transaction system for HBase." (Year: 2012).*

* cited by examiner

DISTRIBUTED PESSIMISTIC LOCK BASED ON HBASE STORAGE AND THE IMPLEMENTATION METHOD THEREOF

CROSS REFERENCE TO THE RELATED APPLICATIONS

This application is based upon and claims priority to Chinese Patent Application No. 202010773065.5, filed on Aug. 4, 2020, the entire contents of which are incorporated herein by reference.

TECHNICAL FIELD

The present invention relates to a method for implementing database pessimistic lock, in particular to a distributed pessimistic lock based on HBase storage and the implementation method thereof.

BACKGROUND

Database technology mainly refers to relational database. From the early stand-alone database to the current mainstream distributed database, the problems to be solved by the database are mainly divided into two categories: OLAP (Online Analytics Processing) and OLTP (Online Transactional Processing). Hereinafter referred to as OLAP and OLTP.

OLAP, also known as Online Analytical Processing system, sometimes is called DSS decision support system, which is what we call data warehouse. In such a system, the execution time of a statement may be very long, and there will be no parallel execution of a large number of statements.

OLTP, also known as Online Transaction Processing, refers to systems with very high transactional capabilities, they are generally online systems with high availabilities focusing on small transactions and small queries. In such a system, a single database often processes more than thousands or even tens of thousands of transactions per second, which requires extremely high levels of transaction concurrency, and there are many more cases of transaction conflicts compare to OLAP.

The implementation of transaction concurrency control in the database can be divided into two categories, namely optimistic lock and pessimistic lock. The following describes the performance of the two mechanisms in OLAP and OLTP and the selection of mainstream databases.

Optimistic lock assumes that multi-user concurrent transactions will not affect each other and will not cause transaction conflicts during processing, each transaction can process the part of the data affected by each without using locks. Before committing to a data update, each transaction will first check whether the other transactions have modified the data after the transaction reads the data. If the other transactions are updated, the transaction that is being committed will be rolled back, and the user will be reported to the error of the transaction conflict. Thus, the user needs to repeat the entire transaction once encounters such an error.

Pessimistic lock assumes that the data to be accessed by a transaction is bound to conflict, and it will be protected by the lock in the process of reading or modifying. Only when the transaction commits and releases the lock, other transactions can perform operations that conflict with the lock. By making the transaction wait for the lock, parallel operations are executed in serial.

Analysis of the current mainstream distributed databases, such as Apache Trafodion and TiDB, reveals that all of them use optimistic lock transaction concurrency mechanism. This mechanism has very few transaction conflicts by default, and can perform better in scenarios with fewer conflicts. However, optimistic lock transaction concurrency mechanism is not very suitable when the transaction concurrency conflict is high. In addition, optimistic lock requires application transformation, which is difficult to implement for many applications.

Analysis of the current mainstream stand-alone database, such as Oracle, MySQL, shows that all of them use pessimistic lock transaction concurrency mechanism. At present, with the development of Internet, Internet of things, 5G, cloud computing, and other emerging technologies, the amount of data is at an explosive growth. The stand-alone machine database is affected by the configuration of a single physical machine that limits the transaction concurrency. As the current trend in the mainstream development of database is directed towards distributed database, there is an urgent need to implement pessimistic lock on the distributed database.

The optimistic lock mentioned above assumes that the probability of data competition between transactions is relatively small. Therefore, it process the transactions directly as long as possible, and it is not locked until the time of submission, and the necessary conflict detection is carried out to ensure the isolation and consistency of transactions. In the scenario of high concurrency, such as rush purchases of goods when only a few people can actually succeed in purchasing of the goods while others fail. Due to the optimistic locking mechanism, users who ended up not completing the purchase will only be informed of their purchase did not indeed go through at the later stage of goods settlement. Most transactions would need to go through many redundant operations and the transaction would get rolled back, which causes a large consumption of resources. In view of this situation, it is necessary to utilizes pessimistic locks to solve this problem, with locking before accessing the data, the user would be informed whether the purchase is successful during the earlier flash purchase phase instead of the later goods settlement phrase, thus avoiding the unnecessary resource consumption.

Presently, the database that uses pessimistic locking mechanism is a stand-alone database. Under the current hardware conditions, a stand-alone database can support the storage of tens of millions of data in a single table, but it is difficult to support intensive concurrent read and write process, and there is a performance bottleneck. Even if a partition table scheme is adopted, the data still cannot be stored across instances, and the scalability and maintainability are also poor. On the other hand, if a partition scheme is adopted, the clients need to manage the database connection by themselves. Given that the database connection management and upgrades are complex, database expansion and relocation are difficult, the support capacity of ordinary servers is limited while the prices of a brand-named servers are high. The cost to improve the concurrent performance by adding hardware specifications is too high and the performance which it can reach is limited. Therefore, it is necessary to study and improve the technology of pessimistic lock in a distributed system.

SUMMARY

In view of the above-mentioned shortcomings, one of the objectives of the present invention is to provide a distributed pessimistic lock based on HBase storage and its implementation method, in order to solve the problem that: the pessimistic lock transaction concurrency mechanism in the prior art cannot be used on a distributed database system; the stand-alone machine is difficult to support intensive concurrent reading and writing, and there is performance bottleneck; and finally, since the scheme of partition and sub-database has poor scalability and maintenance, the database connection management and upgrade are complex and difficult to expansion and migration, the cost of the server is too high.

In order to solve the above technical problems, the present invention adopts the following technical solutions:

In one aspect, a distributed pessimistic lock based on HBase storage, including: a lock manager used to install on a Region of a RegionServer node of a HBase system, wherein the lock manager has a lock and unlock interface, and the lock, an operation transaction, and a lock holder form a cross linked list format; a horizontal dimension is an information of a current data row, a vertical dimension is an information of the operation transaction, and an intersection point between the horizontal dimension and the vertical dimension is the lock holder.

As a preferred embodiment, a further technical solution including the operation transaction that is a database operation sequence for accessing and operating a plurality of data items, the locks added in the database operation sequence are all stored in an object collection of a Transaction of the lock manager.

Preferably, the lock includes a table lock and a row lock, a table lock object corresponds to a Region table, and a rowKey property value of the Region table is empty; a row lock object corresponds to a data row of the Region table, and a rowKey property value of the data row of the Region table is a row key of the current data row.

Preferably, the lock holder is newly created when the operation transaction locks the data through the lock manager, and the lock holder includes a lock type, a lock mode, and the operation transaction.

Preferably, the lock mode includes a shared read lock, an exclusive lock, an update lock, an intent read lock, and an intent exclusive lock.

In the other aspect, a method for implementing the above distributed pessimistic lock based on HBase storage, the method including the following steps:

before executing an operation transaction on a HBase system, apply to a lock manager, by the operation transaction, for locking, if locking is successful, execute the current operation transaction; if locking is not successful, wait for retrying the lock;

during a locking process, the lock manager first query a transaction number of the current operation transaction, if the transaction number of the current operation transaction exists, continue to query a row number of a data row operated by the current operation transaction; if the transaction number of the current operation transaction does not exist, create the transaction number, and then continue to query the row number of the data row operated by the current operation transaction;

if the row number of the data row operated by the current operation transaction exists, continue to query lock holder information; if the row number of the data row operated by the current operation transaction does not exist, create the row number of the current data row, and then continue to query the lock holder information;

if the lock holder information is queried, determine whether the lock is allowed; if the lock holder information isn't queried, create the lock holder information, and then determine whether the lock is allowed;

if the lock is allowed, modify and lock the lock holder information, and the lock to be successful; if the lock is not allowed, reject the lock and wait for retry; if the lock is not allowed after N times, the locking is failed.

Preferably, the method includes unlocking, after the current operation transaction is submitted or rolled back, the lock manager queries the transaction number of the current operation transaction, and traverses to delete the lock holder corresponding to the current transaction number, then deletes the transaction object corresponding to the current transaction number; finally the data row of the current transaction operation is unlocked.

Preferably, a way of determining whether to allow locking is to obtain the information that the current operation transaction is locked in the current data row through the existing lock holder information, and obtain the information that the transaction in the current row is locked through the corresponding data row number, determine the difference between the two information to obtain the lock information in addition to the current operation transaction, and after obtaining key lock information, use a conflict matrix and a compatibility matrix to determine whether the current lock type is allowed to be added.

Preferably, the operation transactions performed on the HBase system includes a Get operation, a Scan operation, a Put operation, and a Delete operation. The Get operation is to acquire a row of data through Key, the Scan operation is to acquire a piece of continuous data through StartKey and EndKey, the Put operation is to add a piece of data through Key, and the Delete operation is to delete a piece of data through Key.

Preferably, the lock type applied by the operation transaction to the lock manager includes a shared read lock, an exclusive lock, an update lock, an intent read lock and an intention exclusive lock.

Compared with the prior art, one of the advantages of the present invention is: by installing the lock manager on the node Region of HBase storage system, the data operation of the HBase system can be locked and unlocked with the pessimistic lock, by using the characteristics of pessimistic lock, the data storage system can support more frequent transaction concurrent operations; compared with the optimistic lock, it can effectively reduce the system resource consumption; in addition, the HBase storage system is a highly reliable, high-performance and is a scalable distributed storage system that can build a large-scale structured storage cluster on a cheap PC server that can be linearly expanded and thereby overcome the constraints of a single machine. Additionally, there is no performance bottleneck problem, and the cost of implementing it on PC servers is low as the distributed pessimistic lock architecture based on HBase storage provided by the present invention is simple, easy to implement, and suitable for use on various HBase data systems, and has a wide range of applications.

DETAILED DESCRIPTION OF THE EMBODIMENTS

The present invention will be further explained below in conjunction with the drawings.

Figure 1:
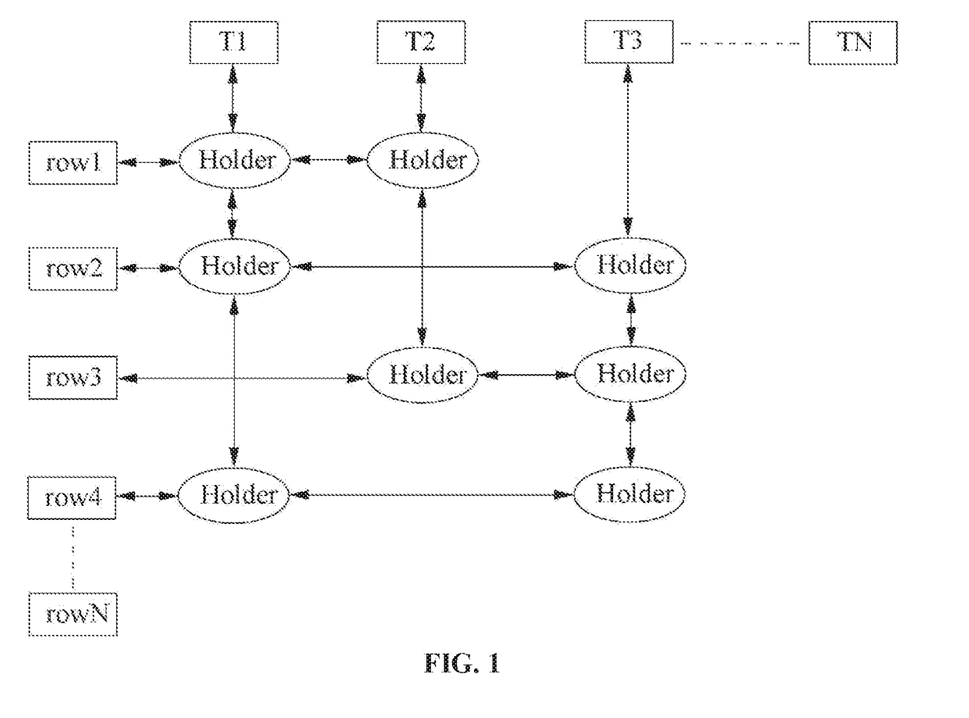
FIG. 1 is a schematic block diagram illustrating the structure of a lock manager according to the present invention.

An embodiment of the present invention is a distributed pessimistic lock based on HBase storage, including a lock manager, which is used to install on a Region of a Region-Server node of a HBase system. The structure of the lock manager is shown in FIG. 1, in which the lock manager has a lock and unlock interface, and a lock, an operation transaction, and a lock holder form a cross linked list format; the horizontal dimension represents information of a current data row, the vertical dimension represents an information of the operation transaction, and the intersection point between the horizontal dimension and the vertical dimension represents the lock holder. Such a cross hash linked list design is simple and clear, easy to maintain complex lock information.

Based on the pessimistic lock structure described above, its working concepts are explained as follows:

The above operation transaction is a database operation sequence for accessing and operating various data items. All locks added in the database operation sequence are stored in the object collection of Transaction of the lock manager. These operations are either all performed, or all not performed, which is an inseparable unit of work. There is a collection of operation transactions (Transaction class objects) in the lock manager.

The above lock includes a table lock and a row lock, a table lock object corresponds to a Region table, and a rowKey property value of which is empty; a row lock object corresponds to a data row of the Region table, and a rowKey property value of which is a row key of the current data row. Specifically, the lock is represented by the Lock class objects, and the lock represents resources. A table corresponds to a table Lock object, and its rowKey property value is empty; a table data row corresponds to a row Lock object, and its rowKey property value is the row key of the current row.

The lock holder is newly created when the operation transaction locks the data through the lock manager, and the lock holder includes a lock type, a lock mode, and an operation transaction. The above lock mode includes S lock (shared read lock), X lock (exclusive lock), U lock (update lock), IS lock (intent read lock), and IX lock (intent exclusive lock). The lock conflicts between THE operation transactions are controlled by the conflict matrix (see Table 1), and the compatibility of the locks within transactions is controlled by the compatibility matrix (see Table 2). Specifically, the lock holder mentioned above includes three attributes, i.e., operation transaction, lock, and lockMode, which lock mode is added to the lock by the operation transaction. When adding a lock, a new lockHolder is created. The lock holder is added to the end of the lock holder list of the Lock object. At the same time, the lock holder is added to the end of the lock holder list in the operation transaction.

The lock, the operation transaction, and the lock holder form a cross linked list format, the horizontal dimension represents information of the data row, the vertical dimension represents information of the operation transaction, and the intersection point between the horizontal dimension and the vertical dimension is the lock holder.

TABLE 1

Conflict Matrix

|    | X | U | IX | S | IS |
|----|---|---|----|---|----|
| IS | 1 | 0 | 0  | 0 | 0  |
| S  | 1 | 0 | 1  | 0 | 0  |
| IX | 1 | 1 | 0  | 1 | 0  |
| U  | 1 | 1 | 1  | 0 | 0  |
| X  | 1 | 1 | 1  | 1 | 1  |

In the above table, 1 means conflict, and 0 means no conflict.

TABLE 2

Compatibility Matrix

|    | X | U | IX | S | IS |
|----|---|---|----|---|----|
| IS | 0 | 0 | 0  | 0 | 1  |
| S  | 0 | 0 | 0  | 1 | 1  |
| IX | 0 | 0 | 1  | 0 | 1  |
| U  | 0 | 1 | 0  | 1 | 1  |
| X  | 1 | 1 | 1  | 1 | 1  |

In the above table, 1 means compatible, 0 means incompatible.

By installing the lock manager on the node Region of the HBase storage system, the pessimistic lock can lock and unlock the data operation of the HBase system. the data storage system can support more frequent transaction concurrent operations by using the characteristics of pessimistic lock. Compared with the optimistic lock, it can effectively reduce the system resource consumption, in addition, the HBase storage system is a highly reliable, high-performance and scalable distributed storage system that can build a large-scale structured storage cluster on a cheap PC server, which can be linearly expanded and overcome the constraints of a single machine. Therefore, there is no performance bottleneck problem, and the cost of using it on the PC server is low.

Based on the above description, HBase is a high-performance scalable distributed storage system that is highly reliable. Using HBase technology, a large-scale structured storage cluster can be built on the cheap PC server.

Figure 2:
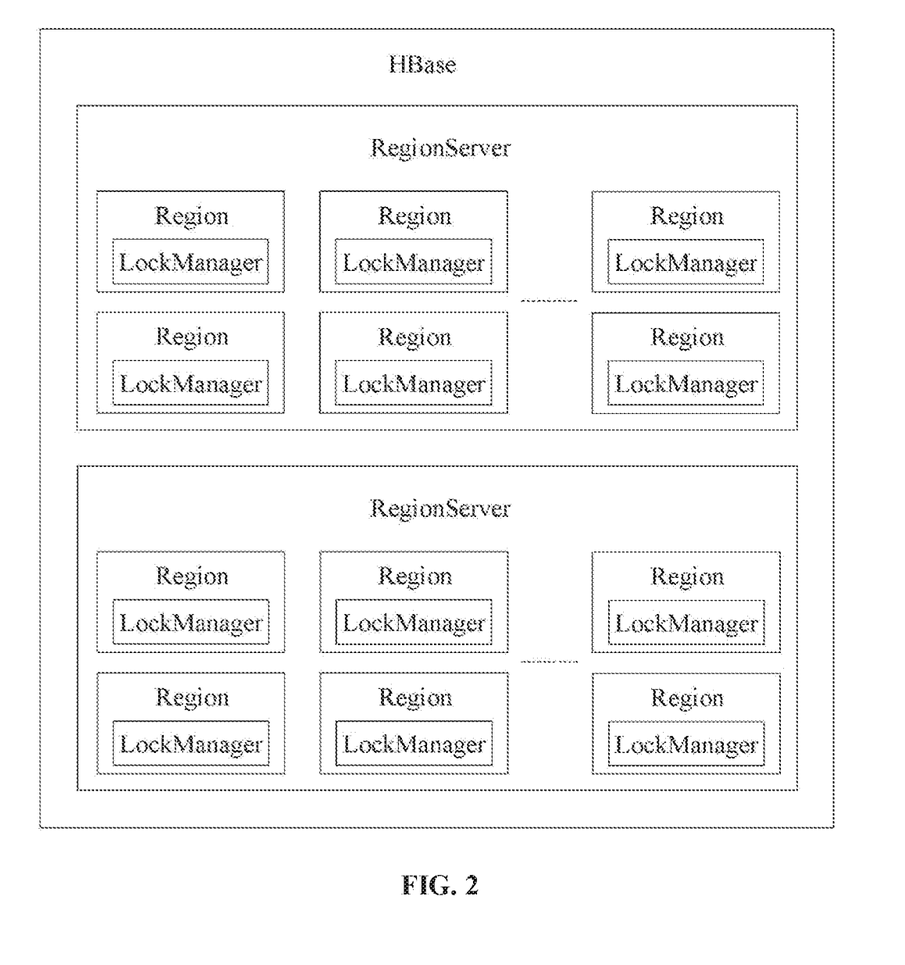
FIG. 2 is a design architecture diagram of a distributed pessimistic lock based on HBase storage according to the present invention.

Each node that manages data in the HBase system is called a RegionServer, and each RegionServer manages one or more Regions. The data is stored on the Region. The pessimistic lock is achieved through the HBase Coprocessor acting on each Region. Generally, the operation transaction performed on the HBase includes four operations, they are a Get operation, a Scan operation, a Put operation and a Delete operation. The Get operation is to acquire a row of data through Key, the Scan operation is to acquire a piece of continuous data through StartKey and EndKey, and the Put operation is to add a piece of data through Key, and the Delete operation is to delete a piece of data through Key. According to the logic of pessimistic lock needs to be locked, S lock should be added before Get, multi row S lock before Scan, X lock before Put and X lock before the four operations as stated above. These locking operations and the release of lock after the operation transaction is completed and the transaction is committed all need to be managed. The object that manages the lock is called the lock manager. Each lock manager only manages the data in the current Region. The design architecture is shown in FIG. 2.

Figure 3:
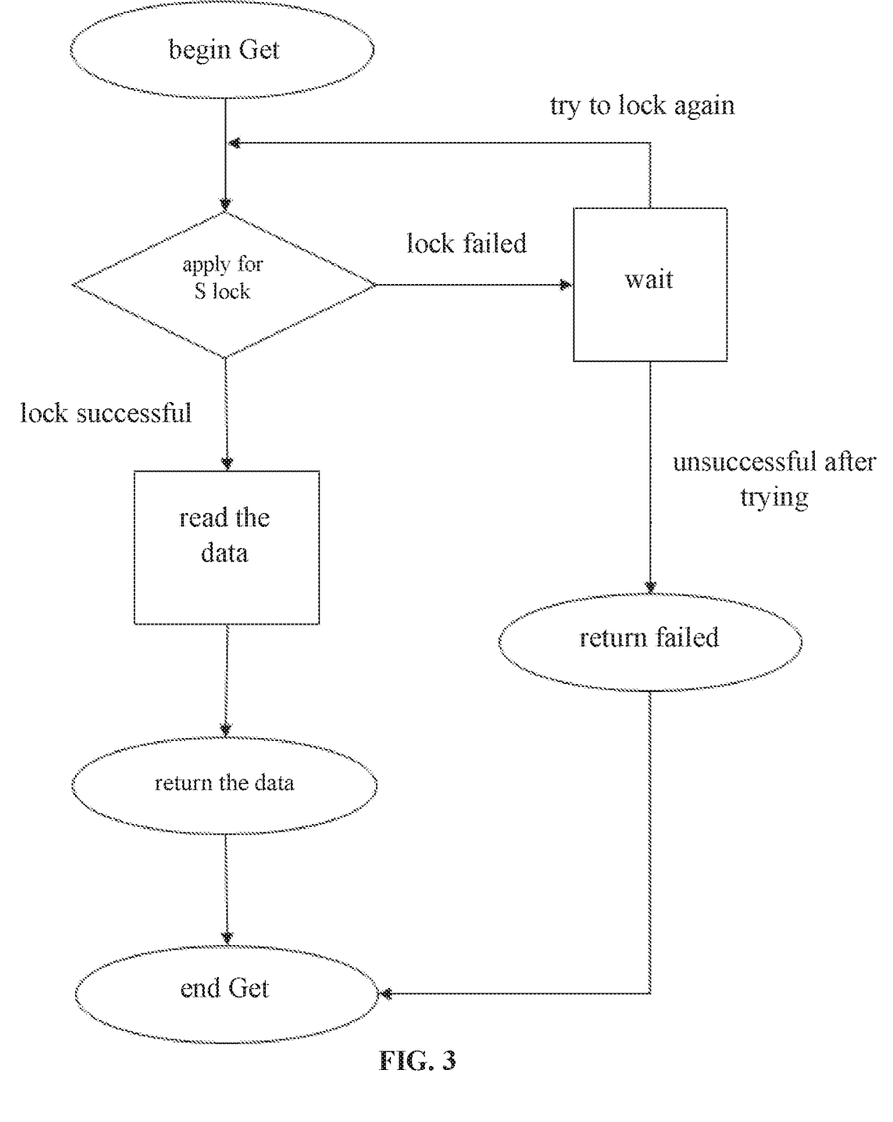
FIG. 3 is a flowchart for method for implementing a pessimistic lock on HBase storage according to the present invention.

The present invention includes a method for implementing the above distributed pessimistic lock based on HBase storage, the method including the following steps:

before executing the operation transaction on the HBase system, the operation transaction first applying to the lock manager for locking, if the locking is successful, executing the current operation transaction; if the locking is failed, waiting for retrying the lock; as shown in FIG. 3, take the Get operation as an example to illustrate data locking;

the above operation transaction performed on the HBase system includes a Get operation, a Scan operation, a Put operation and a Delete operation, the Get operation is to acquire a row of data through Key, the Scan operation is to acquire a piece of continuous data through StartKey and EndKey, and the Put operation is to add a piece of data through Key, and the Delete operation is to delete a piece of data through Key. The lock type applied by the operation transaction to the lock manager includes S lock (a shared read lock), X lock (an exclusive lock), U lock (an update lock), IS lock (an intent read lock) and IX lock (an intent exclusive lock).

Figure 4:
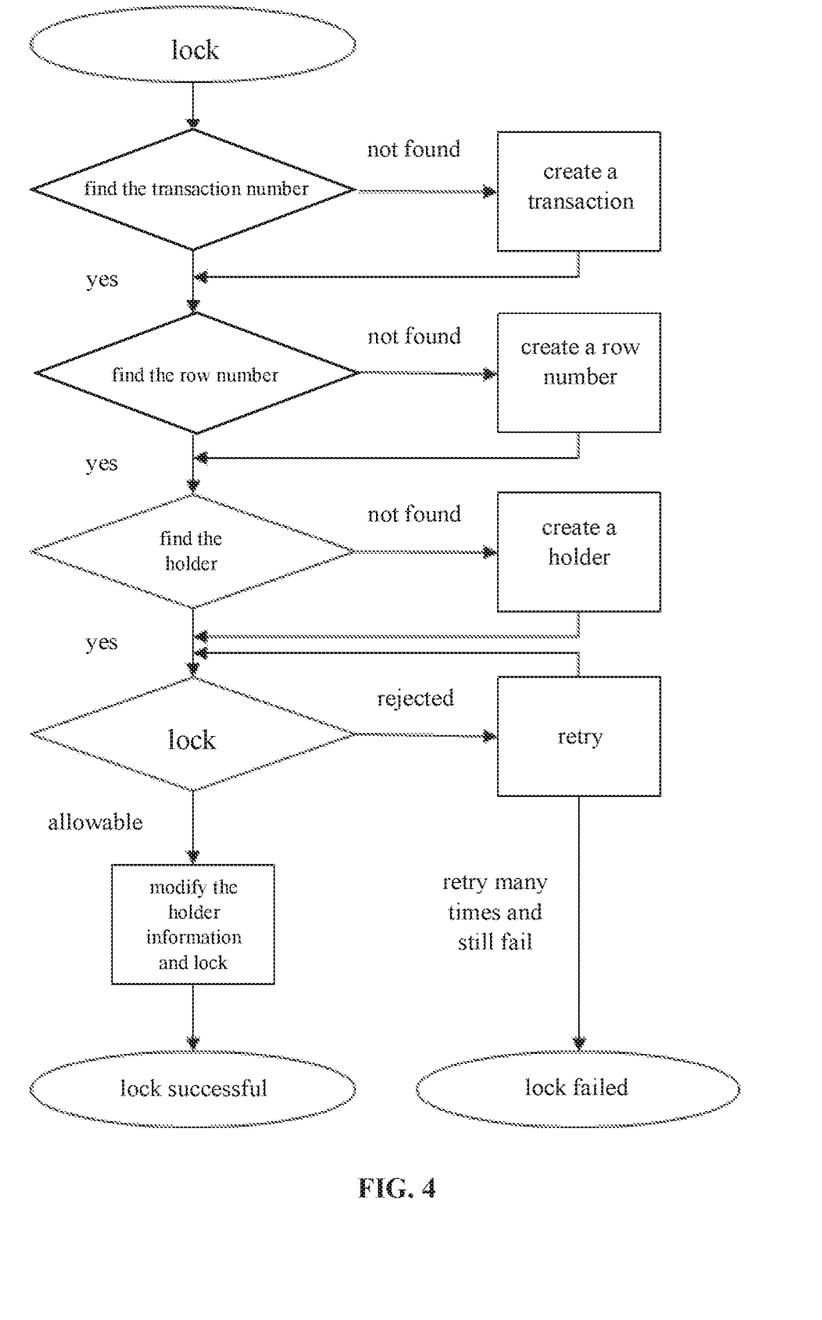
FIG. 4 is a flowchart for illustrating a pessimistic lock according to an embodiment of the present invention.

As shown in FIG. 4, during a locking process, the lock manager first queries a transaction number of the current operation transaction, if the transaction number of the current operation transaction exists, continues to query a row number of a data row operated by the current operation transaction; if the transaction number of the current operation transaction does not exist, first creates the transaction number, and then continues to query the row number of the data row operated by the current operation transaction;

if the row number of the data row operated by the current operation transaction exists, continues to query lock holder information; if the row number of the data row operated by the current operation transaction does not exist, first creates the row number of the current data row, and then continues to query the lock holder information;

if the lock holder information is queried, determine whether the locking is allowed; if the lock holder information is not queried, first creates the lock holder information, and then determine whether the locking is allowed;

a way of determining whether to allow locking is to obtain the information that the current operation transaction is locked in the current data row through the existing lock holder information, and obtain the information that the transaction in the current row is locked through the corresponding data row number, determine the difference between the two information to obtain the lock information in addition to the current operation transaction, and after obtaining key lock information, use a conflict matrix and a compatibility matrix to determine whether the current lock type is allowed to be added;

if the lock is allowed, modify and lock the lock holder information, and the locking is successful; if the lock is not allowed, rejects the lock and waits for retrying; if the lock is not allowed after N times, the locking is failed.

In addition, the method of the present embodiment further includes unlocking, i.e., after the current operation transaction is submitted or rolled back, the lock manager queries the transaction number of the current operation transaction, since the lock has been successfully added, the transaction number must exist. After querying the lock holder by transaction number, the lock manager traverses to delete the lock holder corresponding to the current transaction number, then deletes the transaction object corresponding to the current transaction number; and the data row of the current transaction operation is unlocked.

Based on the above-mentioned locking process of the pessimistic lock, the inventor further explains it in conjunction with FIG. 4 as follows:

The parameters that need to be determined in the locking process are transaction number, row number, and lock type. After the parameters are passed to the lock manager, check whether there is a corresponding operation transaction according to the transaction number. If there is no corresponding operation transaction according to the transaction number, create a new operation transaction; if there is a corresponding operation transaction according to the transaction number, the vertical dimension can be determined. The next step is to find out whether there is a corresponding row, if there is no corresponding row, create a new row; if there is a corresponding row, determine the horizontal dimension. According to the horizontal and vertical dimensions, the lock holder that needs to be modified is locked, in case of lacking a horizontal and vertical dimension at first, there is a requirement to create a new horizontal and/or vertical dimension. If there is any information that the current operation transaction is locked in the current data row through the existing lock holder information, obtain the information that the transaction in the current row is locked through the corresponding data row number, determine the difference between the two information to obtain the lock information in addition to the current operation transaction, and after obtaining key lock information, use a conflict matrix and a compatibility matrix to determine whether the current lock type is allowed to be added. If the lock is rejected and retried for a certain number of times, the lock fails. If the lock is successful for a certain time, return to the lock success after modifying the lock holder information.

Based on the above mentioned embodiments, the lock manger adopts the cross hash linked list way, so that the vertical dimension is the information of the current operation transaction, and the horizontal dimension is only the information of the current row, the intersection position of which determines the lock information of a certain operation transaction on a certain row is the lock holder. The design is simple and clear and is easy to maintain complex lock information. In addition, the lock manager only manages data at the current Region level, which greatly improves the concurrency of key operation transactions in OLTP scenarios and improves performance efficiency. At the same time, the pessimistic lock is realized through HBase Coprocessor, and the existing mechanism of HBase is fully utilized to reduce development complexity and shorten the development cycle.

Therefore, the present invention has the advantages of both the pessimistic locking transaction concurrency mode and the distributed system. Compared with the mainstream single-machine database that adopts the pessimistic locking mode, the application of present invention does not have the performance bottleneck problem and can be expanded linearly to get rid of the single-machine database. Compared with the mainstream distributed database that utilize the optimistic lock, the application of present invention can support higher transaction concurrency and higher OLTP performance.

The "one embodiment", "another embodiment", "embodiment", etc. mentioned in the specification mean that the specific features, structures or characteristics described in conjunction with the embodiment are included in at least one embodiment of the general description of this application. The occurrence of the same expression in multiple places in the specification does not necessarily refer to the same embodiment. Furthermore, when describing a specific feature, structure, or characteristic in combination with any embodiment, it is claimed that combining other embodi- Although the present invention has been described with reference to a number of explanatory embodiments of the present invention, it should be understood that many other modifications and embodiments can be devised by those skilled in the art, and these modifications and embodiments will fall within the scope and spirit of the principles disclosed in the application. More specifically, within the scope of the disclosure, drawings and claims of the present application, various modifications and improvements can be made to the component parts and/or the layout of the theme combination layout. In addition to the modification and improvement of the component parts and/or the layout, other uses will also be obvious to those skilled in the art.

What is claimed is:

1. A method for implementing a distributed pessimistic lock by a HBase storage system, wherein the HBase storage system including a plurality of RegionServer nodes, and a lock manager is installed on a Region of one of the plurality of RegionServer nodes of the HBase storage system, the lock manager has a lock interface and an unlock interface, and the lock manager includes a cross linked list containing information about distributed pessimistic locks, operation transactions, and lock holders, wherein a horizontal dimension of the cross linked list represents information of a current data row, a vertical dimension of the cross linked list represents information of an operation transaction, and an intersection point between the horizontal dimension and the vertical dimension is a corresponding lock holder, the method comprises:

before executing the operation transaction on the HBase system, applying to the lock manager for a locking, by the operation transaction, if the locking is successful, executing a current operation transaction; if the locking failed, waiting for retrying the distributed pessimistic lock;

during a locking process, querying a transaction number of the current operation transaction, by the lock manager, if the transaction number of the current operation transaction exists, continuing to query a row number of a data row operated by the current operation transaction; if the transaction number of the current operation transaction does not exist, creating the transaction number, and then continuing to query the row number of the data row operated by the current operation transaction;

if the row number of the data row operated by the current operation transaction exists, continuing to query lock holder information; if the row number of the data row operated by the current operation transaction does not exist, creating the row number of the current data row, and then continuing to query the lock holder information;

if the lock holder information is queried, determining whether the locking is allowed; if the lock holder information isn't queried, first creating the lock holder information, and then determining whether the locking is allowed;

if the locking is allowed, modifying and locking the lock holder information, and the locking to be successful; if the locking is not allowed, rejecting the locking and waiting for retrying; if the locking is not allowed after N times, the locking is set to fail.

2. The method according to claim 1, wherein the method comprises unlocking, wherein after the current operation transaction is submitted or rolled back, the lock manager queries the transaction number of the current operation transaction, and then traverses to delete the lock holder corresponding to a current transaction number, then deletes a transaction object corresponding to the current transaction number; and the data row of the current transaction operation is unlocked.

3. The method according to claim 1, wherein determining whether to allow the locking further comprises obtaining first information where the current operation transaction is locked in the current data row through an existing lock holder information, and obtaining second information where the operation transaction in a current row is locked through a corresponding data row number, determining differences between the first information and the information to obtain key lock information in addition to the current operation transaction, and after obtaining the key lock information, using a conflict matrix and a compatibility matrix to determine whether a current lock mode is allowed to he added.

4. The method according to claim 1, wherein the operation transaction performed on the HBase system comprises a Get operation, a Scan operation, a Put operation and a Delete operation, wherein the Get operation is to acquire a row of data through Key, the Scan operation is to acquire a piece of continuous data through StartKey and EndKey, and the Put operation is to add a piece of data through Key, and the Delete operation is to delete a piece of data through Key.

5. The method according to claim 1, wherein a lock mode applied by the operation transaction to the lock manager comprises a shared read lock, an exclusive lock, an update lock, an intent read lock, and an intent exclusive lock.

6. The method according to claim 1, wherein the operation transaction is a database operation sequence for accessing and operating a plurality of data items, wherein distributed pessimistic locks added in the database operation sequence are all stored in an object collection of a Transaction of the lock manager.

7. The method according to claim 1, wherein the distributed pessimistic lock comprises a table lock, a row lock, a table lock object corresponds to a Region table, and a rowKey property value of the Region table is empty; wherein a row lock object corresponds to a data row of the Region table, and a rowKey property value of the data row of the Region table is a row key of the current data row.

8. The method according to claim 1, wherein the lock holder is newly created when the operation transaction locks data through the lock manager, and the lock holder comprises a lock type, a lock mode and the operation transaction.

9. The method according to claim 8, wherein the lock. mode comprises a shared read lock, an exclusive lock, an update lock, an intent read lock, and an intent exclusive lock.

* * * * *